US007606829B2

(12) United States Patent
Dettinger et al.

(10) Patent No.: US 7,606,829 B2
(45) Date of Patent: *Oct. 20, 2009

(54) MODEL ENTITY OPERATIONS IN QUERY RESULTS

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/106,282

(22) Filed: Apr. 14, 2005

(65) Prior Publication Data

US 2006/0235835 A1    Oct. 19, 2006

(51) Int. Cl.
*G06F 17/00* (2006.01)
*G06F 17/30* (2006.01)

(52) U.S. Cl. .............................. 707/103 Y; 707/103 R; 707/3

(58) Field of Classification Search ...................... 707/3, 707/103 R, 103 Y
See application file for complete search history.

(56) References Cited

U.S. PATENT DOCUMENTS

| 5,713,014 | A | * | 1/1998 | Durflinger et al. ............. 707/4 |
| 5,734,887 | A | * | 3/1998 | Kingberg et al. .............. 707/4 |
| 6,490,590 | B1 | * | 12/2002 | Fink .......................... 707/100 |
| 6,505,228 | B1 | * | 1/2003 | Schoening et al. ........... 718/106 |
| 6,694,306 | B1 | * | 2/2004 | Nishizawa et al. ............. 707/3 |
| 6,725,227 | B1 |   | 4/2004 | Li |
| 6,769,124 | B1 | * | 7/2004 | Schoening et al. ........... 719/316 |
| 2003/0026143 | A1 | * | 2/2003 | Brennan ..................... 365/200 |
| 2003/0113727 | A1 | * | 6/2003 | Girn et al. ..................... 435/6 |
| 2003/0169284 | A1 | * | 9/2003 | Dettinger et al. ............ 345/708 |
| 2004/0181538 | A1 | * | 9/2004 | Lo et al. ..................... 707/100 |
| 2004/0193579 | A1 | * | 9/2004 | Dettinger et al. ............... 707/3 |
| 2006/0161522 | A1 | * | 7/2006 | Dettinger et al. ............... 707/3 |

OTHER PUBLICATIONS

U.S. Appl. No. 10/083,075, "Application Portability and Extensibility Through Database Schema and Query Abstraction", filed Feb. 26, 2002.
U.S. Appl. No. 11/005,418, "Abstract Query Plan", filed Dec. 6, 2004.
U.S. Appl. No. 10/403,356, "Dealing with Composite Data Through Data Model Entities", Mar. 31, 2003.

* cited by examiner

*Primary Examiner*—Don Wong
*Assistant Examiner*—Thanh-Ha Dang
(74) *Attorney, Agent, or Firm*—Patterson & Sheridan, LLP

(57) ABSTRACT

The present invention provides methods, systems and articles of manufacture that enhance the capability of a database abstraction model and query application constructed for an underlying physical database. Typically, the query application is used to compose and execute an abstract query. Once an initial query result is presented to a user, a user may select to execute a model entity operation by interacting with a query interface of the query application. A model entity operation allows the user to retrieve additional information from the underlying database, based on information included in the initial query result, without having to create a new query or having to correlate the results of multiple queries.

7 Claims, 10 Drawing Sheets

| TESTS TABLE | |
|---|---|
| PATIENT ID | HEMOGLOBIN_TEST |
| 10 | 28.6 |
| 20 | 29.3 |
| 30 | 18.2 |
| 40 | 19.5 |
| 50 | 27.4 |
| 60 | 17.3 |

410

| LINEAGE TABLE | | |
|---|---|---|
| PATIENT ID | FATHER | MOTHER |
| 10 | NULL | NULL |
| 20 | 50 | 30 |
| 30 | NULL | NULL |
| 40 | 50 | 30 |
| 50 | NULL | 80 |
| 60 | 20 | NULL |

MODEL ENTITY OPERATIONS IN QUERY RESULTS

CROSS-REFERENCE TO RELATED APPLICATIONS

This application is related to a commonly assigned, co-pending, U.S. patent application Ser. No. 10/083,075, filed Feb. 26, 2002, entitled "Application Portability and Extensibility through Database Schema and Query Abstraction," incorporated herein by reference in its entirety. This application is also related to commonly assigned, co-pending U.S. patent application Ser. No. 10/403,356, filed Mar. 31, 2003, entitled "Dealing with Composite Data through Data Model Entities," incorporated herein by reference in its entirety. This application is also related to commonly assigned, co-pending application entitled "Abstract Query Plan," Ser. No. 11/005,418, filed Dec. 6, 2004, which is incorporated by reference herein in its entirety.

BACKGROUND OF THE INVENTION

1. Field of the Invention

The invention generally relates to computer database systems. More particularly, the invention relates to techniques for using query results for an initial query as input for subsequent database queries.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

Queries of a relational database may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. An SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. patent application Ser. No. 10/083,075 (the '075 application) entitled "Application Portability and Extensibility through Database Schema and Query Abstraction," discloses techniques for constructing a database abstraction model over an underlying physical database.

The '075 application discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as =, >, <, >=, and, <=, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

Users interact with the database abstraction model to compose and execute queries that retrieve data from the underlying physical database. Once query results are retrieved and displayed to a user, however, the query processes is essentially finished. Typically though, queries are composed to retrieve information that a user may find interesting. Oftentimes, the data retrieved for an initial query may itself raise new questions in the mind of a user, or a user may desire additional information based on the results of the initial query. For example, a medical researcher viewing a set of query results about one patient may be interested in viewing information about members of the patient's family. If the researcher desires additional information based on a review of the initial query results, however, a new query must be generated from scratch, or the original query must be reloaded and modified. Alternatively, the researcher must run several queries and manually correlate information retrieved about individual patients. Accordingly, it would be useful for the database abstraction model to allow users to perform subsequent query operations using information included in an initial query result.

SUMMARY OF THE INVENTION

The present invention provides methods, systems and articles of manufacture that extend the capability of a database abstraction model and query application. Generally, embodiments of the invention allow a user that has retrieved an initial set of query results to view additional information, based on the query results, without having to compose a new query from scratch, or from manually correlating information retrieved using multiple queries.

One embodiment of the invention provides a method for processing a data access request. The method generally includes receiving a user request to perform a model entity operation, wherein the request includes an indication of at least one instance of a model entity along with the desired query operation. The model entity is used to identify the focus for the query operation, and is defined by a database abstraction model logically describing an underlying database. Instances of the model entity are distinguished by an identifier in an underlying database. The method further includes, retrieving, in response to the request, a linking function configured to identify instances of the model entity that are related to the at least one instance of the model entity, according to a predefined relationship. And further includes, performing the model entity operation by invoking the linking function to retrieve any related instances of the at least one instance of the model entity, executing the desired query operation against any retrieved instances of the model entity, and returning any instances of the model entity identified using the linking function that satisfy any conditions specified by the query operation.

Another embodiment of the invention provides a computer-readable medium containing a program, which when executed on a computer system performs an operation for accessing data stored in an underlying physical database. The operations generally include receiving a user request to perform a model entity operation, wherein the request includes an indication of at least one instance of a model entity and a desired query operation. Generally, the model entity is defined by a database abstraction model and defines the focus for a query operation, and instances of the model entity may be distinguished from one another by using an identifier in an underlying database. The operations generally further include retrieving, in response to the request, a linking function configured to identify instances of the model entity that are related to the at least one instance of the model entity, according to a predefined relationship. And further includes, performing the model entity operation by invoking the linking function to retrieve any related instances of the at least instance of the model entity, executing the desired query operation against any retrieved instances of the model entity, and returning instances of the model entity identified using the linking function that satisfy any conditions specified by the query operation.

Another embodiment of the invention provides a system. The system generally includes a physical database and a database abstraction model that describes the data stored in the physical database. Generally, the database abstraction model defines (i) a plurality of logical fields that each specify an access method for accessing data in the physical database, (ii) a model entity that specifies an identifier in the physical database used to distinguish instances of the model entity, and (iii) at least one linking function configured to identify instances of the model entity that are related to an instance of the model entity input to the linking function. The system generally further includes a runtime component configured to receive an abstract query composed from the plurality of logical fields, and in response, is configured to generate and execute a resolved query of the underlying physical database, thereby retrieving an initial query result, and further configured to receive a request to perform a model entity operation for at least one instance of the model entity included in the initial query result, wherein the runtime component performs the model entity operation by executing the at least one linking function using the at least instance of the model entity included in the initial query result as input to the linking function. The system generally further includes a query building interface for composing an abstract query from the plurality of logical fields, wherein the interface is configured to display the initial query results to a user, and further configured to generate the request to perform a model entity operation.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated by the appended drawings. These drawings, however, illustrate only typical embodiments of the invention and are not limiting of its scope, for the invention may admit to other equally effective embodiments.

FIG. 4 further illustrates an embodiment of the database abstraction model first illustrated in FIG. 2B, modified to support model entity operations in query results.

DETAILED DESCRIPTION OF THE PREFERRED EMBODIMENTS

Figure 1:
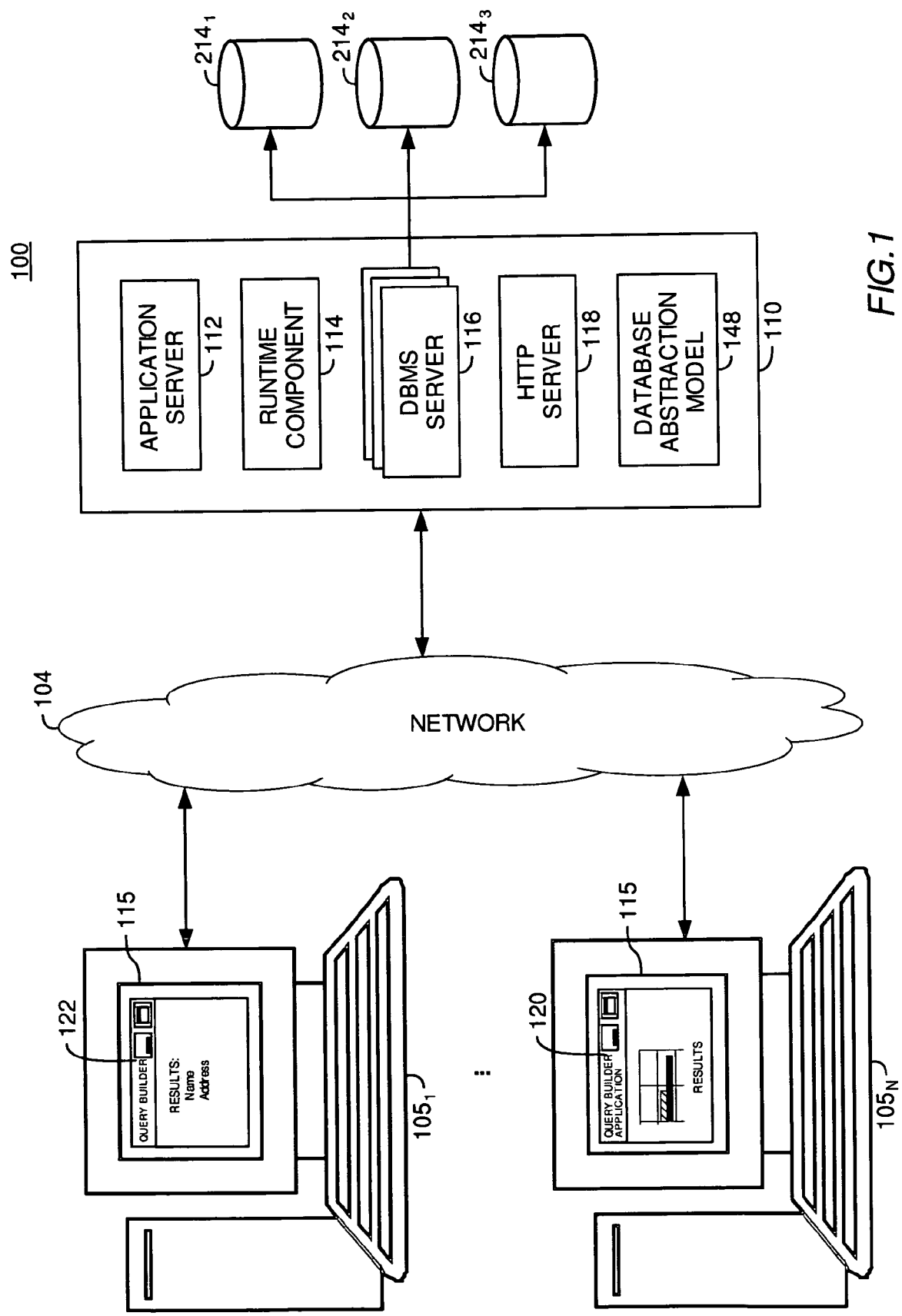
FIG. 1 illustrates exemplary computer systems and a data communications environment, according to one embodiment of the invention.

The present invention provides methods, systems, and articles of manufacture that allow users of an abstract database to perform subsequent query operations based on an initial query result. The subsequent query operations allow a user to retrieve additional information about an entity included in the initial query result. For example, a medical researcher may execute a query that identifies a set of patients. After being presented with data for the patients identified by the query, the researcher may wish to retrieve and display information associated with a relative of a particular patient included in the query results. Embodiments of the invention provide a query interface that allows the researcher to retrieve this information without having to compose a new query or having to correlate information retrieved from multiple queries.

In one embodiment, an abstract query specifies a type of model entity being queried (e.g., a patient an employee or a test). That is, a model entity defines the focus, or central concept, for an abstract query. Rather than compose a query data based on the structure of an underlying database (e.g., an SQL schema), users compose a query about a model entity (e.g., about a patient) by specifying attributes and conditions that instances of the model entity should have in order to be included in the query results. Doing so allows users to compose complex queries in a straightforward and intuitive manner.

As described in greater detail below, each instance of a model entity (e.g., a specific patient, employee or test) may be identified using data from the underlying physical database, such as the primary key of a relational table. For example, instances of a patient model entity may be identified using a unique "Patient ID" value created for each patient. In addition, a model entity definition may specify what information about the model entity is available in the database. Abstract queries are used to identify instances of the model entity that satisfy the conditions of the abstract query.

Embodiments of the invention allow users to determine information about related model entities. For example, a user at a medical research institution may desire to identify patients who suffered a heart attack before turning thirty-five. In such a case, the user would compose an abstract query about a "Patient" model entity. From the query results, the user may wish to identify siblings, patients, etc. who did not satisfy the query (i.e., patients who did not suffer a first heart attack before turning thirty-five), but are nonetheless interesting to a researcher seeking to identify a correlation between a patients' family history and heart attacks. Another example might be a law firm manager querying an employee model entity. Such a user might compose an abstract query that identifies highly productive associates within a particular practice group, and model entity operations could then be used to identify other, less productive, associates from within the same practice group.

More generally, what both of these examples have in common is using the model entities identified in a first set of query results as the basis for further inquiry. Thus, model entity operations are different than simply adding additional information to an abstract query. To add additional conditions, a user must know up-front what they are looking for; oftentimes however, this is impossible as what will be desired can only be determined from the results of the initial query. Further, model entity operations are different than a "drill down" functionality where a user is presented with summary information in the form of query results and then allowed to view more detailed information by selecting and expanding the summary. Because instances of a particular model entity are not hierarchical to one another, they are not identified by expanding summary results. Embodiments of the invention allow users identify this type of non-hierarchal relationships between model entities. Doing so provides users greater depth and flexibility in querying information stored in the underlying physical database.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Moreover, examples described herein reference medical research environments. These examples are provided to illustrate embodiments of the invention, as applied to one type of data environment. The techniques of the invention, however, are contemplated for any data environment including, for example, transactional environments, financial environments, research environments, accounting environments, legal environments, and the like.

The Database Abstraction Model: Physical View of the Environment

FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on client system 105 (e.g., a Linux® distribution, Microsoft Windows®, IBM's AIX® or OS/400®, FreeBSD, and the like) (Note, "Linux" is a registered trademark of Linus Torvalds in the United States and other countries.)

The server system 110 may include hardware components similar to those used by client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The environment 100 illustrated in FIG. 1, however, is merely an example of one hardware and software environment. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 1 illustrates computer systems using a client-server architecture, embodiments of the invention may be implemented in a single computer system, or in other configurations, including peer-to-peer, distributed, or grid architectures.

In one embodiment, users interact with the server system 110 using a graphical user interface (GUI) provided by interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-sever program or IBM's Web Sphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and the application 120 may be configured to allow a user to compose an abstract query, and to submit the query to the runtime component 114.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases $214_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. In turn, the runtime component 114 receives an abstract query and, in response, generates a resolved query of underlying physical databases 214.

In one embodiment, the runtime component may be configured to generate a physical query (e.g., an SQL statement) from an abstract query. Typically, users may compose an abstract query using the logical fields defined by the database abstraction model 148. And the runtime component 114 may be configured to use the access method defined for a logical field 208 to generate a query of the underlying physical database (referred to as a "resolved" or "physical" query). Logical fields and access methods are described in greater detail below in reference to FIGS. 2A-2B. Additionally, the runtime component 114 may also be configured to return query results to the requesting entity, (e.g., using HTTP server 118, or equivalent).

The Database Abstraction Model: Logical View of the Environment

Figure 2A:
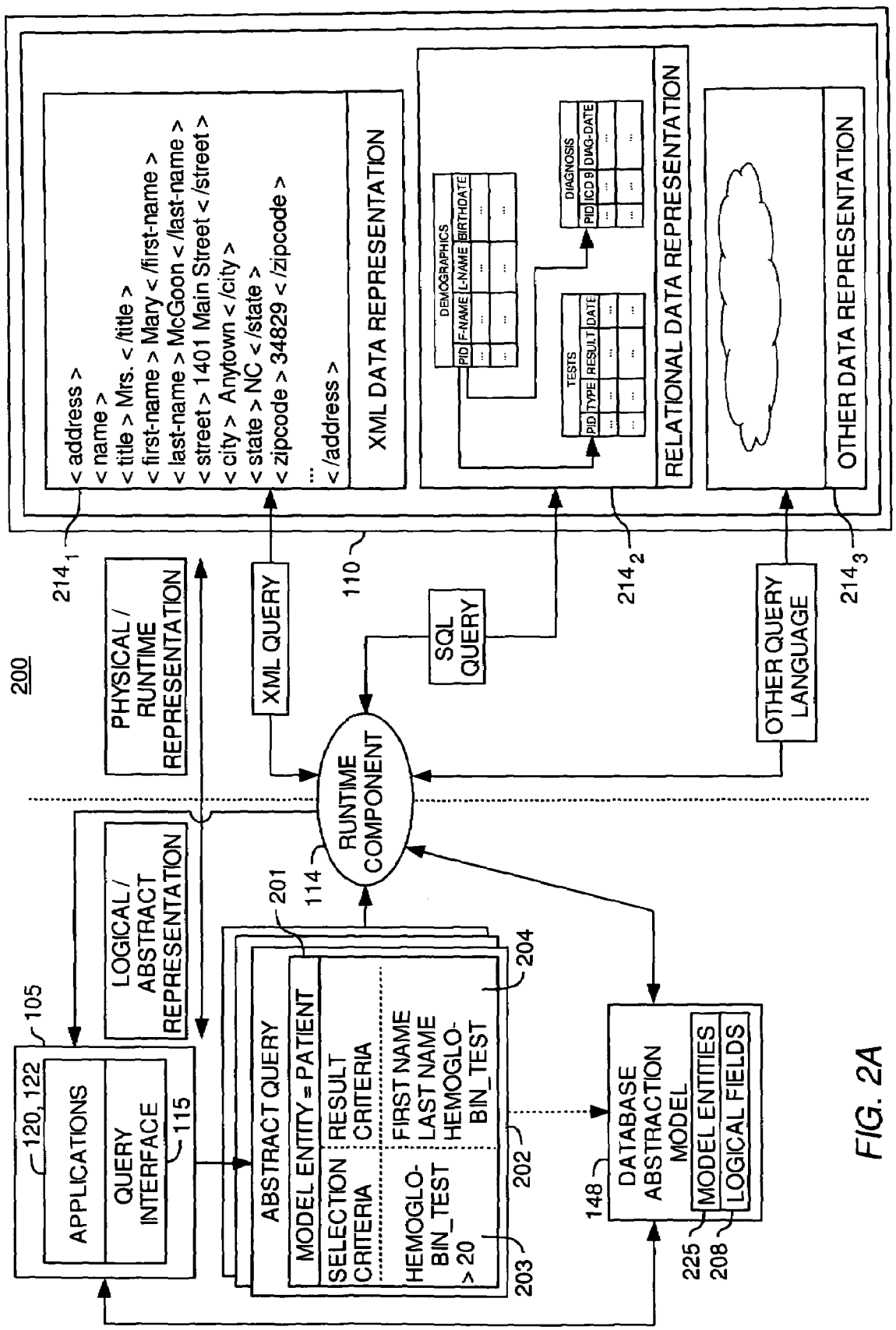
FIG. 2A illustrates a logical view of the database abstraction model constructed over an underlying physical database, according to one embodiment of the invention.

FIG. 2A illustrates a plurality of interrelated components of the invention, along with relationships between the logical view of data provided by the database abstraction model environment (the left side of FIG. 2A), and the underlying physical database environment used to store the data (the right side of FIG. 2A).

In one embodiment, the database abstraction model 148 provides definitions for a set of logical fields 208 and model entities 225. Users compose an abstract query 202 by specifying logical fields 208 to include in selection criteria 203 and results criteria 204. An abstract query 202 may also identify a model entity 201 from the set of model entities 225. The resulting query is generally referred to herein as an "abstract query" because it is composed using logical fields 208 rather than direct references to data structures in the underlying physical databases 214. The model entity 225 may be used to indicate the focus of the abstract query 202 (e.g., a "patient", a "person", an "employee", a "test", a "facility" etc).

For example, abstract query 202 includes an indication of that the query is directed to instances of the "patient" model entity 201, and further includes selection criteria 203 indicating that patients with a "hemoglobin_test >20" should be retrieved. The selection criteria 203 are composed by specifying a condition evaluated against the data values corresponding to a logical field 208 (in this case the "hemoglobin_test" logical field. The operators in a condition typically include comparison operators such as =, >, <, >=, or, <=, and logical operators such as AND, OR, and NOT. Results criteria 204 indicates that data retrieved for this abstract query 202 includes data for the "name," "age," and "hemoglobin_test" logical fields 208.

In one embodiment, users compose an abstract query 202 using query building interface 115. The interface 115 may be configured to allow users to compose an abstract query 202 from the logical fields 208 defined by the database abstraction model 148. The definition for each logical field 208 in the database abstraction model 148 specifies an access method identifying the location of data in the underlying physical database 214. In other words, the access method defined for a logical field provides a mapping between the logical view of data exposed to a user interacting with the interface 115 and the physical view of data used by the runtime component 114 to retrieve data from the physical databases 214.

Additionally, the database abstraction model 148 may define a set of model entities 225 that may be used as the focus for an abstract query 202. In one embodiment, users select which model entity to query as part of the query composition process. Model entities are descried below, and further described in commonly assigned, co-pending application Ser. No. 10/403,356, filed Mar. 31, 2003, entitled "Dealing with Composite Data through Data Model Entities," incorporated herein by reference in its entirety.

In one embodiment, the runtime component 114 retrieves data from the physical database 214 by generating a resolved query (e.g., an SQL statement) from the abstract query 202. Because the database abstraction model 148 is not tied to either the schema of the physical database 214 or the syntax of a particular query language, additional capabilities may be provided by the database abstraction model 148 without having to modify the underlying database. Further, depending on the access method specified for a logical field, the runtime component 114 may transform abstract query 202 into an XML query that queries data from database $214_1$, an SQL query of relational database $214_2$, or other query composed according to another physical storage mechanism using other data representation $214_3$, or combinations thereof (whether currently known or later developed).

Figure 2B:
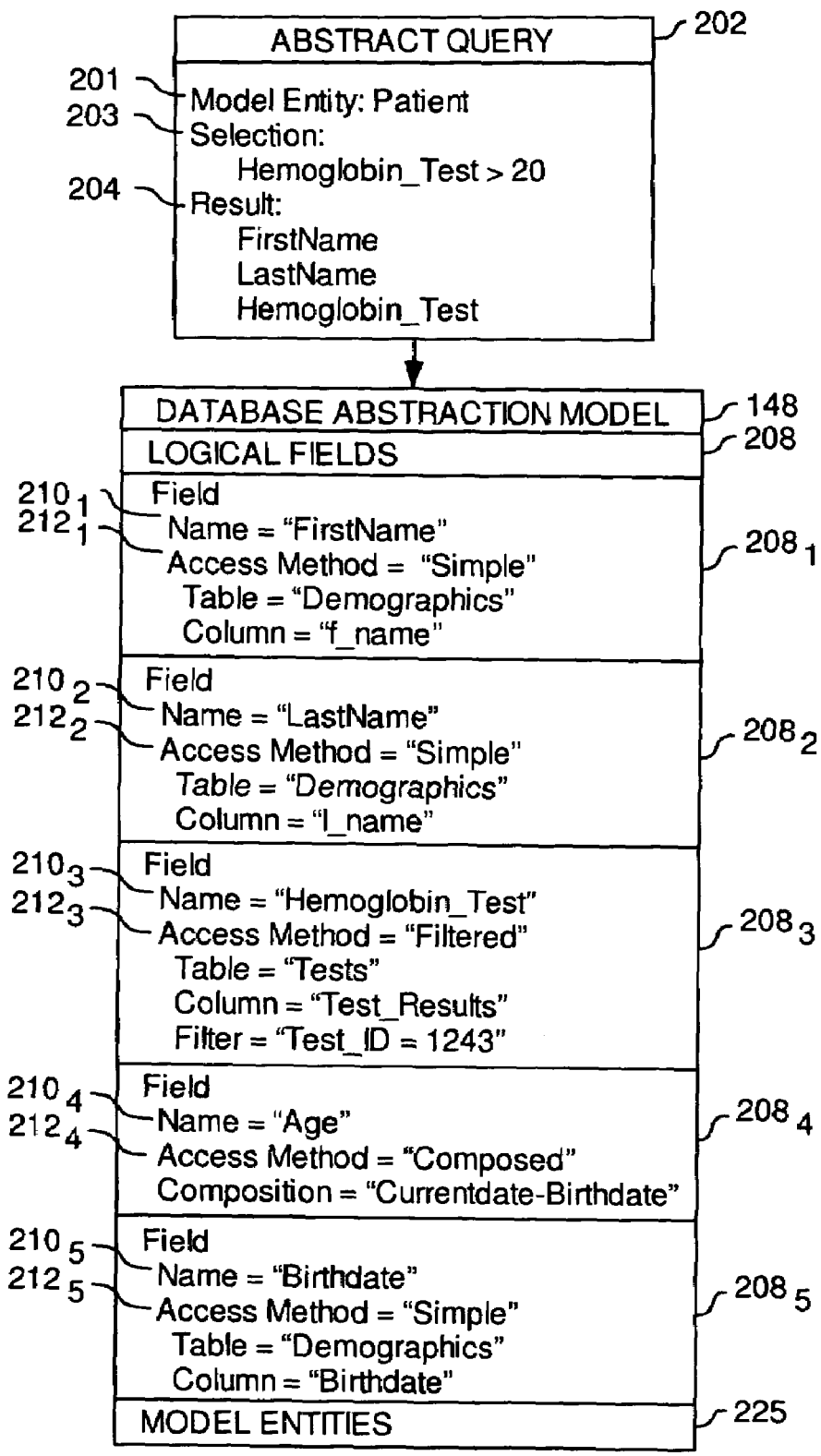
FIGS. 2B-2C illustrate an exemplary abstract query and database abstraction model, according to one embodiment of the invention.

FIG. 2B illustrates an exemplary abstract query 202, relative to the database abstraction model 148, according to one embodiment of the invention. The query includes selection criteria 203 indicating that the query should retrieve instances of the patient model entity 201 with a "hemoglobin" test value greater than "20." The particular information retrieved using abstract query 202 is specified by result criteria 204. In this example, the abstract query 202 retrieves a patient's name and a test result value for a hemoglobin test. The actual data retrieved may include data from multiple tests. That is, the query results may exhibit a one-to-many relationship between a particular model entity and the query results An illustrative abstract query corresponding to abstract query 202 is shown in Table I below. In this example, the abstract query 202 is represented using eXtensible Markup Language (XML). In one embodiment, application 115 may be configured to generate an XML document to represent an abstract query composed by a user interacting with the query building interface 115. Those skilled in the art will recognize that XML is a well known markup language used to facilitate the sharing of structured text and information, other markup languages, however, may be used.

TABLE I

Query Example

| | |
|---|---|
| 001 | <?xml version="1.0"?> |
| 002 | <!-Query string representation: ("Hemoglobin_test > 20") |
| 003 | <QueryAbstraction> |
| 004 |    <Selection> |
| 005 |       <Condition> |
| 006 |          <Condition field="Hemoglobin Test" operator="GT" value="20" |
| 007 |       </Condition> |
| 008 |    </Selection> |
| 009 |    <Results> |
| 010 |          <Field name="FirstName"/> |
| 011 |          <Field name="LastName"/> |
| 012 |          <Field name="hemoglobin_teset"/> |
| 013 |    </Results> |
| 014 |    <Entity name="patient" > |
| 015 |          <FieldRef name="data://patient/PID" /> |
| 016 |          <Usage type="query" /> |
| 017 |       </EntityField> |
| 018 |    </Entity> |
| 019 | </QueryAbstraction> |

The XML markup shown in Table I includes the selection criteria 203 (lines 004-008) and the results criteria 204 (lines 009-013). Selection criteria 203 includes a field name (for a logical field), a comparison operator (=, >, <, etc) and a value expression (what the field is being compared to). In one embodiment, the results criteria 204 include a set of logical fields for which data should be returned. The actual data returned is consistent with the selection criteria 203. Line 13 identifies the model entity selected by a user, in this example, a "patient" model entity. Thus, the query results returned for abstract query 202 are instances of the "patient" model entity. Line 15 indicates the identifier in the physical database 214 used to identify instances of the model entity. In this case, instances of the "patient" model entity are identified using values from the "Patient ID" column of a patient table.

After composing an abstract query, a user may provide it to runtime component 114 for processing. In one embodiment, the runtime component 114 may be configured to process the abstract query 202 by generating an intermediate representation of the abstract query 202, such as an abstract query plan. In one embodiment, an abstract query plan is composed from a combination of abstract elements from the data abstraction model and physical elements relating to the underlying physical database. For example, an abstract query plan may identify which relational tables and columns are referenced by which logical fields included in the abstract query, and further identify how to join columns of data together. The runtime component may then parse the intermediate representation in order to generate a physical query of the underlying physical database (e.g., an SQL statement(s)). Abstract query plans and query processing are further described in a commonly assigned, co-pending application entitled "Abstract Query Plan," Ser. No. 11/005,418, filed Dec. 6, 2004, which is incorporated by reference herein in its entirety.

FIG. 2B further illustrates an embodiment of a database abstraction model 148 that includes a plurality of logical field specifications $208_{1-5}$ (five shown by way of example). The access methods included in logical field specifications 208 (or logical field, for short) are used to map the logical fields 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "Test_Result" column of a "Tests" tests table and defines a filter "Test_ID='1243.'" Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name" logical filed (not shown) composed from the first name and last name logical fields $208_1$ and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the model entities, logical fields, access methods, and additional metadata that, collectively, define the database abstraction model 148 for a particular physical database system. Other storage mechanisms or markup languages, however, are also contemplated.

Figure 2C:
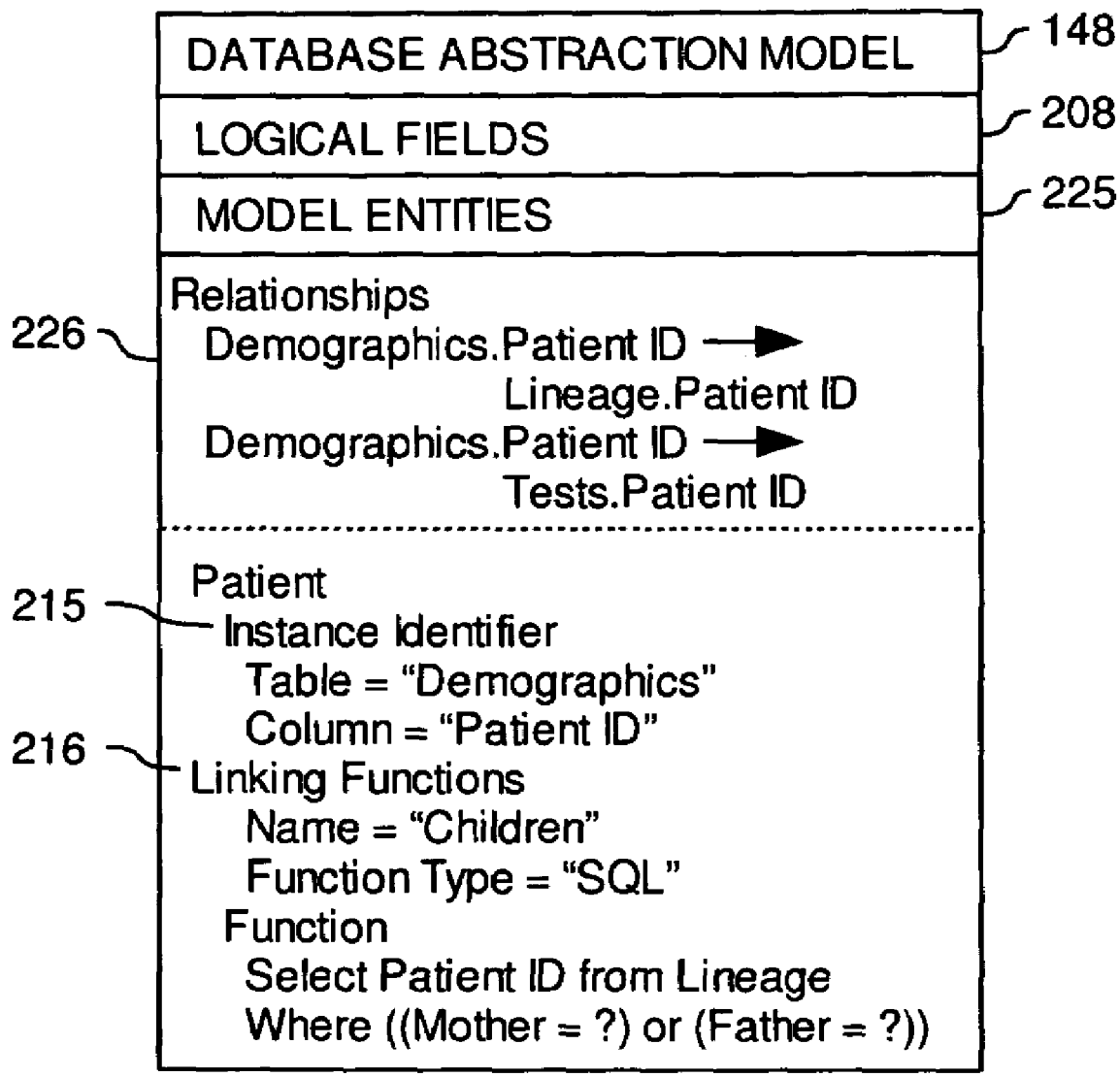

Referring to FIG. 2C, Model entity section 225 includes a definition for the "patient" model entity. Illustratively, the "patient" model entity 225 is defined with a name (for the model entity: "patient") and an instance identifier 215 used to distinguish between instances of the patient model entity. Model entity relationships section 226 identifies data available in database 214 that is related to instances of the "patient" model entity. For example, the first model entity relationship indicates that data from a row of the demographics table and the linage table that share a common "patient ID" store data about the same instance of the "patient" model entity. Collectively, relationships section 226 defines the "universe" of data about the model entity captured by the underlying physical database 214.

In one embodiment, the model entity also defines one or more linking functions 216 based on a predefined relationship between two (or more) instances of the model entity. For example, two instances of the "patient" model entity may represent related individuals such as a parent and child. The definition for the "patient" model entity 225 includes a "children" linking function 216. This function takes an instance of a "patient" model entity, and returns any related instances (i.e., any children) of the input instance. The use of the linking function 216 as part of model entity operations are described in greater detail below. In this example, linking function 216 returns the children of the input "patient" instance using an SQL select statement. Table II, below, illustrates one embodiment for the "patient" model entity that includes the definition of the "children" linking function 216.

TABLE II

| | Model Entity Example using XML |
|---|---|
| 001 | <?xml version="1.0"?> |
| 002 | <ModelEntity name = "Patient" field = "data://demographic/patient ID"> |
| 003 | <ModelEntityLink name = "children"> |
| 004 | select patient ID from lineage where (father = ? or mother = ?) |

TABLE II-continued

| | Model Entity Example using XML |
|---|---|
| 005 | </ModelEntityLink> |
| 006 | </ModelEntity> |

Lines 002-006 illustrate the model entity definition. Specifically, line 002 indicates that different instances of the "Patient" model entity may be identified using data from the underlying database; namely, the patient ID primary key column of a demographic table. Lines 003-005 illustrate a model entity linking function 216. As illustrated, the linking function is defined using an SQL select clause that returns a patient ID for the child of the input patient ID represented by the question mark "?." In operation, if the input value matches either the value for an entry in the "father" column or the "mother" column of table 420, then the patient ID for the father or mother (or both) is returned by the "children" linking function 216.

Figure 5:
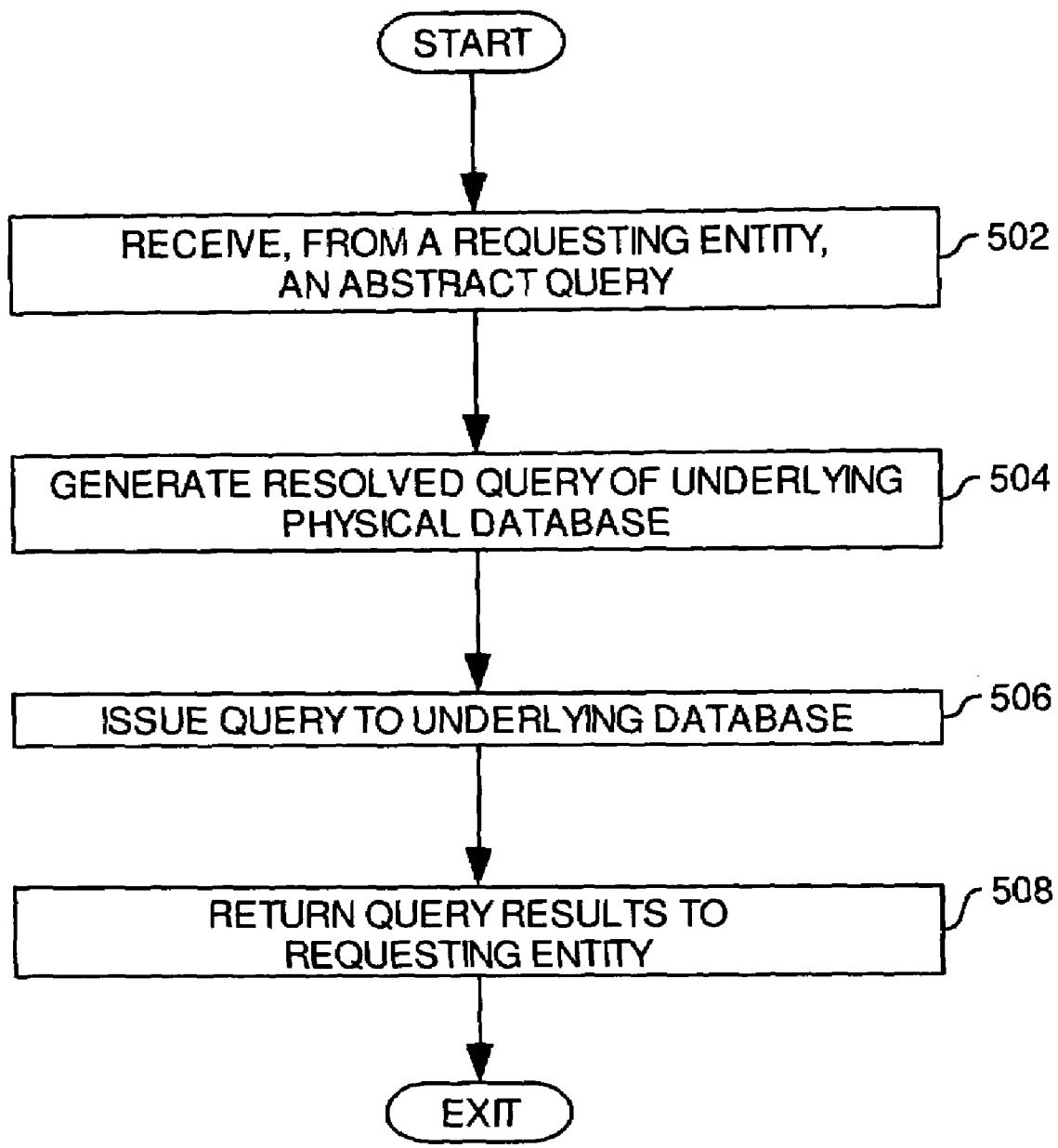
FIG. 5 illustrates a method for processing an abstract query to retrieve an initial set of query results, according to one embodiment of the invention.

FIG. 5 illustrates a method for processing an abstract query and returning an initial set of query results, according to one embodiment of the invention. The method begins at step 502 after a user has composed an abstract query (e.g., using interface 115) and submitted the abstract query for processing. Once received, the runtime component 114 accesses the logical fields and conditions specified in the abstract query, along with the definitions for the logical fields, access methods, and model entity from the database abstraction model 148, and from this data, generates a resolved query of the underlying database (step 504). In one embodiment, the runtime component 114 receives the abstract query over network 104 using well-known data communication protocols, and the abstract query itself may be represented using a structured mark-up language (e.g., using the XML representation of abstract query 202 illustrated in Table I). At step 506, after generating the resolved query, the runtime component 114 issues the resolved query to the underlying physical database 214. After executing the resolved query, query results are returned to the user at step 508. The process of transforming an abstract query into a resolved query is further described in commonly assigned U.S. patent application Ser. No. 10/083,075 (the '075 application) entitled "Application Portability and Extensibility through Database Schema and Query Abstraction," which is incorporated herein by reference in entirety.

Figure 3:
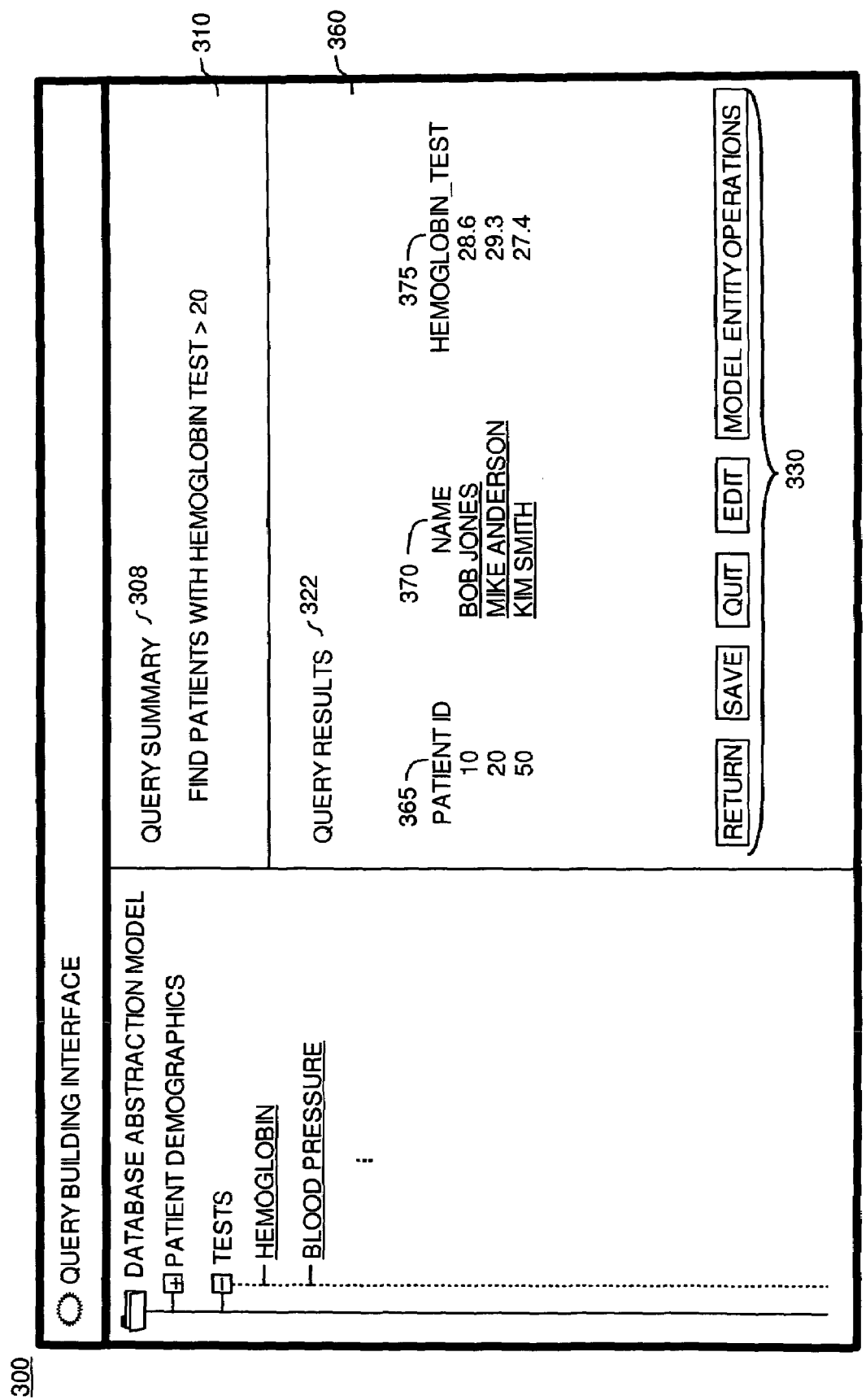
FIG. 3 illustrates an exemplary graphical user interface screen, according to on embodiment of the invention.

As described above, embodiments of the invention provide an interface 115 for composing an abstract query 202. For example, FIG. 3 illustrates an exemplary graphical user interface 115 displaying a set of query results retrieved using abstract query 202 and operations 500. That is, interface screen 300 illustrates data for instances of the "patient" model entity with at least one hemoglobin test result greater than 20. Query summary section 310 illustrates a summary of abstract query 202. Illustratively, the screen 300 includes a query results display section 360 displaying a list of model entity instances, each of which satisfied the conditions of abstract query 202. As illustrated, the query results include data for each logical field included in the results criteria 204 of abstract query 202. Thus, display section 360 includes a display of each patient ID 365 (i.e., each instance of the "patient" model entity returned) and names retrieved for the name logical field 370 and test values for the test results logical field 375. In one embodiment, query results, like the ones shown in query results 360, may be used to perform model entity operations.

As illustrated, only data for the logical fields included in the results criteria of abstract query 202 are displayed. Also, each patient ID is illustrated with an underlined value, representing a hyperlink to other data. In one embodiment, query results may be displayed using a text hyperlink that links to additional data about each individual "patient" model entity. For example, the initial query results may display the requested data, and additional information about a model entity may be accessed using the hyperlink. Thus, by clicking on the hyperlink for "Bob Jones," the user 115 may request additional data available about this instance of the "patient" model entity.

The Database Abstraction Model: Model Entity Operations on Query Results

Embodiments of the invention allow users to execute model entity operations on a set of query results (e.g., the query results displayed in FIG. 3A). In particular, embodiments of the invention may reuse parts of an initial query, allowing a user to link an instance of a model entity with other instances, according to a predefined relationship. For example, model entity operations may rely on consanguinity between individuals, relationships between employees, or on the geographic locations of individuals or things. A user interacting with interface 115 may initiate a subsequent query using the instances of the model entity included in a set of query results for an initial query. The following description uses the "patient" model entity and the "children" linking function 216 as an example of model entity operations; however, any model entity provided by a particular database abstraction model 148 may be used as the basis for model entity operations on query results.

Using the data illustrated by query results 322, for example, assume that the original query was composed by a scientist researching a connection between certain blood disorders that may be prevalent in some families. In such a case, the researcher may desire to identify patients with the blood disorder and then specify query conditions evaluated against data associated with a particular patient's children. Model entity operations provide this functionality without requiring the user to manually compose additional queries, or correlate the results of multiple queries. In one embodiment, model entity operations may be initiated using GUI buttons 330. FIG. 3, for example, includes a "model entity operations" button that when clicked may cause the application 120 (or browser 122) to display an interface for building a query using the model entity operation. In an alternative embodiment, a user may "right-click" on a selected model entity to bring up context-sensitive options for the clicked model entity. Examples of model entity operations using this latter alternative are described in detail below in reference to FIG. 6.

FIG. 4 illustrates a set of relational database tables 400 corresponding to the database abstraction model 148, illustrated in FIGS. 2A and 2B. Illustratively, database tables 400 include data for a patient test table 410 and a lineage table 420. Those skilled in the art will recognize that tables illustrated in FIG. 4 are simplified to illustrate model entity operations on query results, and that a "production" database would likely include more tables columns, and also include more complex relationships between the database tables. For example, the tests table 410 would likely include the results for many different tests distinguished using a tests type column.

Tests table 410 includes the three model entity instances returned for abstract query 202 that satisfied the "hemoglobin >20" condition, along with other patients with hemoglobin test results below 20. Lineage table 420 stores the patient IDs associated with the patient listed in the "Patient ID" column. Reading across any individual row of the lineage table 420 will identify, if available, the patient IDs for the parents of the patient listed in the "Patient ID" column. Thus, as illustrated the "patient" model entity with a patient ID of "50" represents the parent of the "patient" model entities represented by patient IDs "20" and "40." If the patient ID of a parent is not available in the database, the "mother" or "father" column includes a "null" value.

The database abstraction model 148 illustrated in FIG. 2B includes a linking function 216 configured identify related instances of the "patient" model entity from an instance input to the linking function 216. Although only one linking function is illustrated in FIG. 2B, multiple linking functions may be provided for a given model entity. For example, additional linking functions for the "patient" model entity could include "father," "mother," or "siblings," or could include linking functions based on other attributes such as geographic location. For example, a researcher interested in determining the prevalence of a particular type of cancer and a geographic region could use a model entity operation that retrieves patient ID's for patients living in the same zip code or state as the input patient ID.

In at least some embodiments, a user first retrieves instances of the model entity before executing a model entity operation. That is, model entity operations are initiated in reference to a particular set of query results. An abstract query may be used to retrieve instances of a model entity. Thus, a user typically initiates a model entity operation by executing an abstract query, and then uses the query results to perform a model entity operation. Additionally, the interface 115 may allow a user to specify that a model entity operation should be performed relative to a single instance of a model entity included in the query results, or to use multiple instances from the query results. Alternatively, interface 115 may include GUI components for specifying a particular instance (or instances) of model entity to use in performing a model entity operation (e.g., by entering the patient ID value associated with a particular patient into a text box form (not illustrated)).

Figure 6:
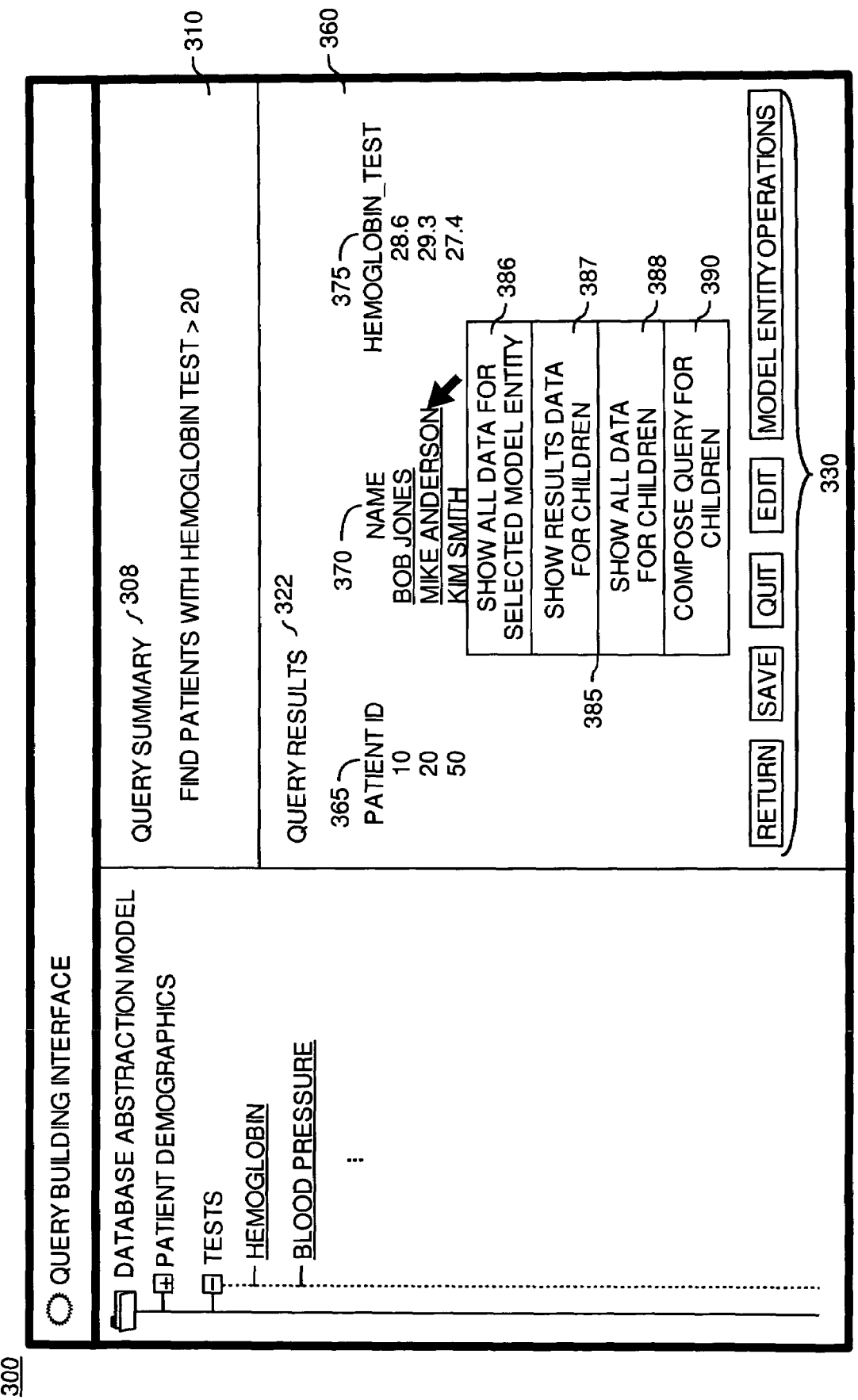
FIG. 6 illustrates an exemplary set of query results displayed using a graphical user interface screen, according to one embodiment of the invention.

FIG. 6 illustrates GUI screen 300 after a user has right clicked on the instance of the "patient" model entity representing an individual with the patient ID of "20." In response, the interface 115 is illustrated displaying a menu 385 of selection choices. Depending on the particular model entity and linking functions that are defined by the database abstraction model 148, different selection choices may be provided. The selection choices displayed by menu 384 in a particular case are configured to provide additional query operations that are appropriate for the model entity displayed in the current query results. Accordingly, in this case, menu 385 displays choices that may be selected to perform a model entity operation using instances of the "Patient" model entity included in query results 322. Menu options 386, 387, 388 and 390, however, are included to illustrate model entity operations, and should not be construed to be limiting of the invention.

Menu option 390 of menu 385 is illustrative of a model entity operation. Menu option 390 allows a user to compose a query with conditions evaluated against data associated with the children of the model entity instances included in query results 322. Patient ID values for the children are identified using the "children" linking function 216. In this example, the menu option 390 is applied to each instance of the "patient" model entity included in query results 322. Accordingly, the linking function 216 may be executed for each instance of the model entity included in query result 322. A user may specify query conditions that instances of the "patient" model entity identified using linking function 216 must satisfy, or may specify what data about the "children" instances a user wishes to see as query results. Any instances so identified are then evaluated according using any additional conditions specified as part of the model entity operation. The conditions may include both selection criteria (e.g., select children over a certain age) or results criteria (e.g., display values for hemoglobin test results).

Menu option 387 illustrates another variation of a model entity operation. Selection 387 allows a user to easily display data associated with the "children" of the "patients" represented by query results 322. The query conditions for menu option 387 may be configured to evaluate instances of the model entity retrieved by linking function 216 using the conditions that were included in the initial query. Further, menu option 387 may be configured to show instances retrieved using linking function 216 that satisfied the initial query conditions, or to display data for instances of the model entity retrieved that do not. That is, the selection may display "children" instances with hemoglobin test values that did not satisfy the "greater than 20" condition. In one embodiment, the interface 115 may guide the user through a series of prompts (commonly known as a "wizard") to specify these types of details for the model entity operation.

Figure 8:
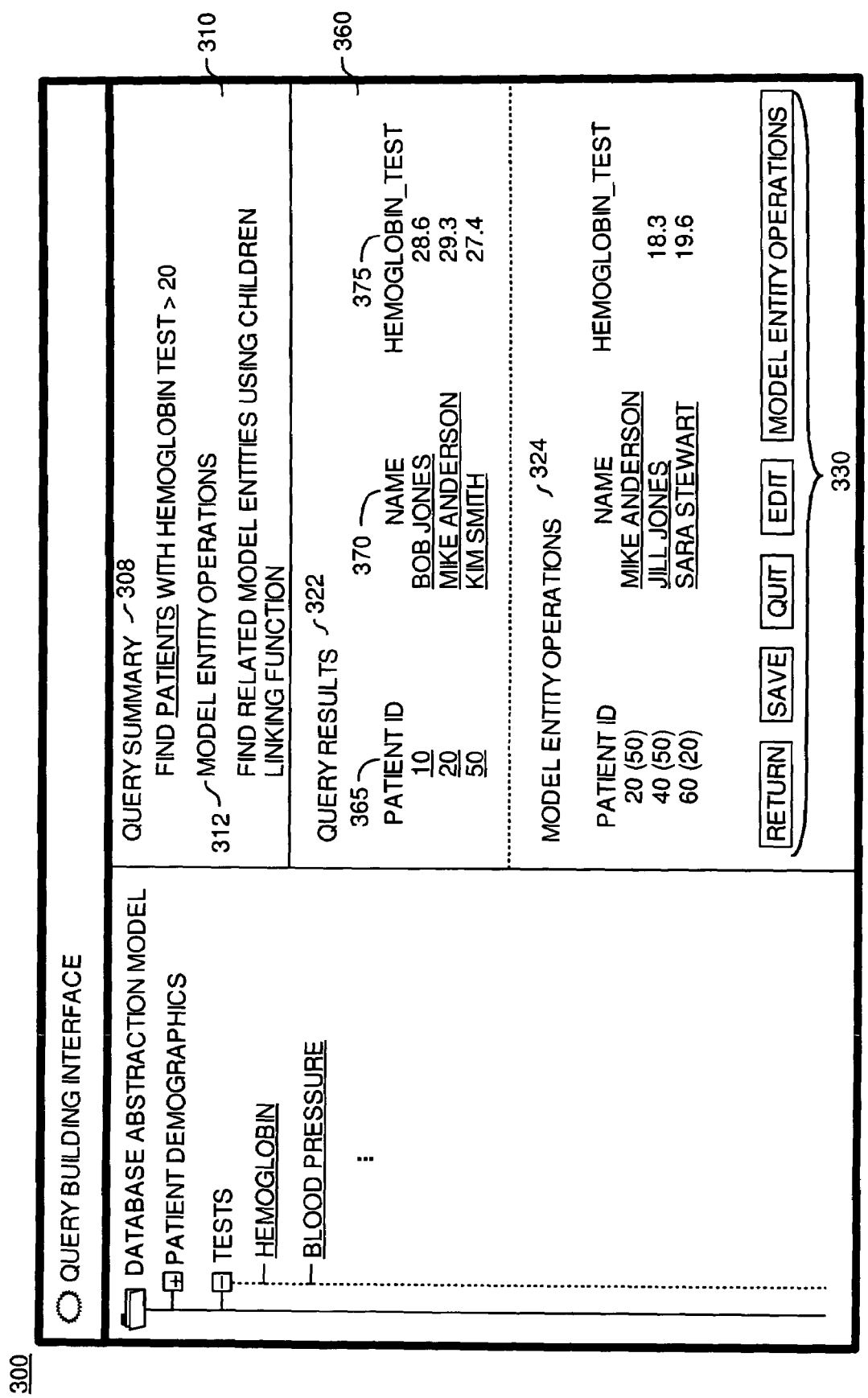
FIG. 8 illustrates an exemplary graphical user interface screen that includes an initial set of query results, and a set of model entities retrieved using a model entity operation, according to one embodiment of the invention.

FIG. 8 illustrates GUI screen 300 after a user selects menu option 387, according to one embodiment of the invention. In this illustration, a user has elected to display query results for data associated with the children of the individuals included in the initial query results 322 (i.e., any children of the "patient" model entity with patient ID's of 10, 20 or 50). The query summary section 310 is modified to reflect the original query summary 308 (Find patients with hemoglobin tests >20) and model entity operation 312 (find related model entities and display result data). The query results section 360 is similarly modified to include both the original query results 322, and results for the model entity operation 324.

As illustrated, the linking function 216 identified three instances of the "patient" model entity (e.g., instances with patient ID values of 20, 40, and 60). Additionally, the instance of the model entity associated with each particular child instance is shown in parentheses. Query data, in this case, data for the hemoglobin test logical field 208, is displayed for each instance of the model entity retrieved using the linking function 216. The first model entity instance (i.e., patient ID "20") identified in model entity operations 324 is also listed in the query results 322. This occurs because this model entity instance satisfied both the initial query (i.e., is a patient had a hemoglobin test >20) but also was identified as the child of the "patient" model entity identified by the "50" patient ID with hemoglobin test data. In one embodiment, the runtime component 114 and query interface 115 may be configured to remove duplicated instances of the model entity from the query results. In such a case, the patent identified by patient ID "20" may be moved and displayed only in the lower portion of display section 360.

Menu option 386 allows a user to display additional information regarding the selected model entity instance. For example, the query result data includes the name, patient ID, and hemoglobin test results for patients satisfying selection criteria 203. The database 214 may store additional information related to each patient. In one embodiment, a user may cause this additional information to be retrieved and displayed using selection 386. Similarly, menu option 388 may be configured to retrieve all of the data (e.g., using model entity relationships 226) for an instance of the patient model entity retrieved using linking function 216. That is, this option may be selected to view data in database 214 about the children of a particular individual represented in initial query results 322. Menu option 386 corresponds to a model entity operation that is executed for a specific instance of the model entity (e.g., one of the instances included in query results 322.)

Figure 7:
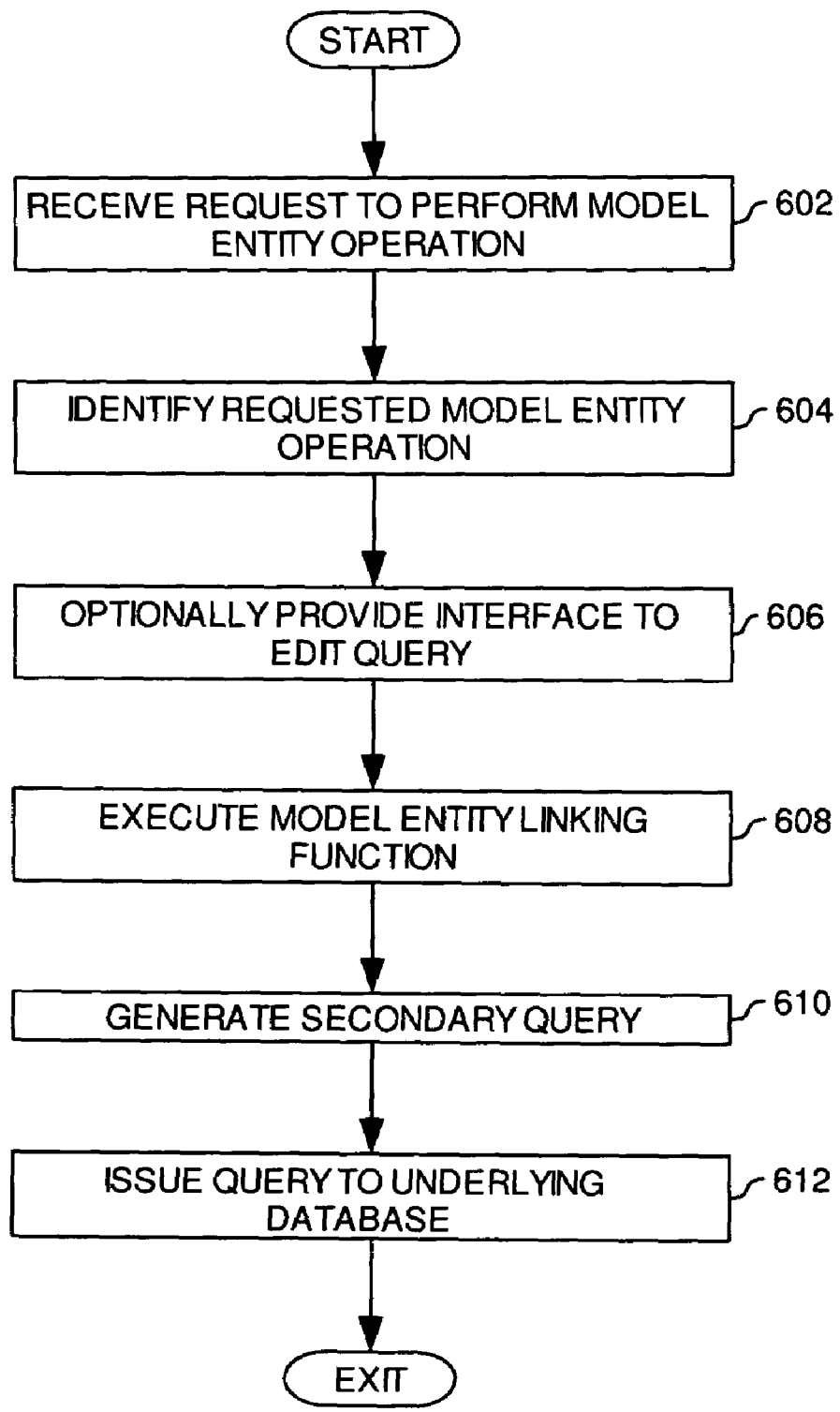
FIG. 7 illustrates a method for processing a model entity operation from a set of query results, according to one embodiment of the invention.

FIG. 7 illustrates a method 600 for performing model entity operations on query results, according to one embodiment of the invention. The method 600 begins at step 602 where the runtime component 114 receives a request to perform a model entity operation (e.g., by selecting a model entity operation from context sensitive menu 385). As step 604, the type of model entity operation requested is identified. For example, if the "patient" model entity included additional linking functions 216, the particular linking function desired is included in the request. At step 606, the runtime component 115 retrieves the linking function 216 identified in the request from the database abstraction model 148. If the requested operation includes additional abstract query criteria (e.g., selection criteria 203 or results criteria 204) then a user is provided with a query building interface 115 to specify the logical fields and conditions. Once the selected linking function 216 and any additional abstract query criteria are identified, the runtime component 114 invokes the linking function to identify instances of the model entity related to the one input to the linking function. Additionally, the runtime component 114 generates a secondary query with any conditions specified by the user (steps 608 and 610), wherein the conditions are evaluated relative to instances of the model entity identified by the linking function. The secondary query is issued against the underlying database 214, to retrieve query results for the model entity operation (step 612) that may then be presented to the user.

Operations 600 may be iteratively performed. For example, as illustrated in FIG. 8, the query now displays a set of model entities (parents) retrieved as the initial query results, as well as their children, identified using model entity operations and linking function 216. The children, however, are themselves instances of the "patient" model entity. The "children" linking function could be applied recursively (finding children of children of children, etc.) until the entire result was a series of hierarchies displayed based on family relationships. Further, a set of linking functions based on consanguinity between patients (e.g., siblings, parents, etc.) would allow a researcher to navigate through an entire family tree of model entities without having to compose individual query after individual query. As the complexity increases, the graphical user interface screen 300 may be configured to display information using separate windows, tabbed windows, using a multiple document interface, trees, charts, graphs or other known or unknown graphical user interface constructs to prevent excessive amounts of much information from appearing on a single screen.

CONCLUSION

The database abstraction model relieves users from having to understand the complexity of a modern database system and query language. By creating a database abstraction model for a physical database, users can compose queries in a straightforward and intuitive manner. Moreover, once created, the database abstraction model may provide additional functions not provided by the underlying database, without having to modify the underlying database. One useful addition to the database abstraction model allows a user to perform model entity operations using query results.

Model entity operations allow a user presented with the results of one query to obtain additional information about the query results, without having to create a new query or having to correlate the results of multiple queries. For example, a researcher presented with query results that identify a group of patients with a certain condition may wish to retrieve information about members of the patient's family. The query interface of the present invention allows the researcher to obtain this information efficiently and easily. In one embodiment, a linking function is used to identify the members of the patient's family. Once identified, data associated with a member of the patient's family may be retrieved and displayed to the researcher. Additionally, a model entity operation may be executed repeatedly, allowing a user to navigate through a hierarchy of related entities, e.g., by iteratively displaying information about related family members.

While the foregoing is directed to embodiments of the present invention additional embodiments of the invention may be devised without departing from the basic scope thereof, and the scope thereof is determined by the claims that follow.

What is claimed is:

1. A method for processing a data access request, comprising:
   receiving a user request to perform a model entity operation, wherein the user request includes a user selection of a first instance of a model entity selected from a plurality of instances of the model entity included in a first query result and a selected query operation, wherein the model entity is defined by a database abstraction model logically describing an underlying database and wherein the model entity defines a focus for the selected query operation, and wherein instances of the model entity are distinguished by an identifier in an underlying database;
   retrieving, in response to the user request, a linking function configured to identify instances of the model entity that are related to the first instance of the model entity, according to a predefined relationship; and
   performing the model entity operation by:
      invoking the linking function to retrieve any instances of the model entity that are related to the first instance of the model entity;
      executing the selected query operation against the retrieved instances of the model entity; and
      returning, as a second query result, at least a second instance of the model entity that satisfies any conditions specified by the selected query operation.

2. The method of claim 1, wherein the first instance of the model entity is selected using a graphical user interface displaying the first query result which provides the plurality of instances of the model entity as user selectable options, which when selected, specifies the linking function and the selected query operation to initiate using the first instance of the model entity.

3. The method of claim 1, wherein the first instance of the model entity is selected from a display of query results retrieved in response to executing an abstract query, wherein the abstract query is composed from a plurality of logical fields defined by the database abstraction model, wherein each logical field specifies a mapping for a logical field to data in the underlying physical database.

4. The method of claim 1, wherein the identifier in the physical database comprises a primary key from a column of a relational table, and wherein the identifier used to distinguish instances of the model entity comprises values stored in the primary key column of the relational table.

5. The method of claim 4, wherein the linking function comprises an SQL query configured to retrieve values stored in the primary key column of the relational table related to a primary key value input to the function.

6. The method of claim 1, wherein the first instance of the model entity represents an individual, and wherein the linking function identifies additional instances of the model entity that represent individuals sharing a consanguineous relationship with the individual represented by the first instance of the model entity.

7. The method of claim 1, wherein the model entity represents an individual, and wherein the linking function identifies additional instances of the model entity that represent individuals related to one another by geographic locations.

* * * * *

UNITED STATES PATENT AND TRADEMARK OFFICE
CERTIFICATE OF CORRECTION

PATENT NO.       : 7,606,829 B2
APPLICATION NO.  : 11/106282
DATED            : October 20, 2009
INVENTOR(S)      : Dettinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Twelfth Day of October, 2010

David J. Kappos
*Director of the United States Patent and Trademark Office*